United States Patent [19]

Hirano et al.

[11] 4,149,774
[45] Apr. 17, 1979

[54] ZOOM LENS SYSTEM

[75] Inventors: Nagayoshi Hirano, Urawa; Yasuo Honda; Yoshikazu Doi, both of Omiya, all of Japan

[73] Assignee: Fuji Photo Optical Co., Ltd., Omiya, Japan

[21] Appl. No.: 851,403

[22] Filed: Nov. 14, 1977

[51] Int. Cl.² ............................................. C02B 15/16
[52] U.S. Cl. ..................................................... 350/184
[58] Field of Search ................................. 350/184, 186

[56] References Cited

U.S. PATENT DOCUMENTS

| | | | |
|---|---|---|---|
| 2,746,350 | 5/1956 | Hopkins | 350/184 |
| 3,127,466 | 3/1964 | Walters | 350/184 |
| 3,687,522 | 8/1972 | Lynch et al. | 350/184 |
| 3,728,010 | 4/1973 | Mikami | 350/184 |
| 3,865,470 | 2/1975 | McCrobie et al. | 350/184 |
| 3,905,685 | 9/1975 | Harper et al. | 350/184 |
| 3,912,374 | 10/1975 | Liu | 350/184 |
| 4,037,937 | 7/1977 | Minoura | 350/184 |
| 4,061,419 | 12/1977 | Price et al. | 350/184 |

Primary Examiner—Conrad J. Clark

[57] ABSTRACT

A zoom lens system in accordance with this invention is composed of a first fixed lens group, a first movable lens group, a second movable lens group and a second fixed lens group arranged in this order from front to rear, wherein a stop is are located at the center of the whole lens system and the first fixed lens group and the second fixed lens group consist of the same lens elements and located symmetrically with respect to the stop, and similarly the first movable lens group and the second movable lens group consist of the same lens elements and are located symmetrically with respect to the stop. The first movable lens and the second movable lens are asymmetrically moved with respect to the stop in accordance with the location of the whole lens system that is changed to vary the magnification, whereby the distortion and the focus shift caused by the field curvature fluctuation are eliminated throughout the variable range of magnification. Further, the zoom lens system in accordance with this invention is characterized in that the power of the lens groups and the lens elements is designed to make the whole lens system compact in size.

5 Claims, 9 Drawing Figures

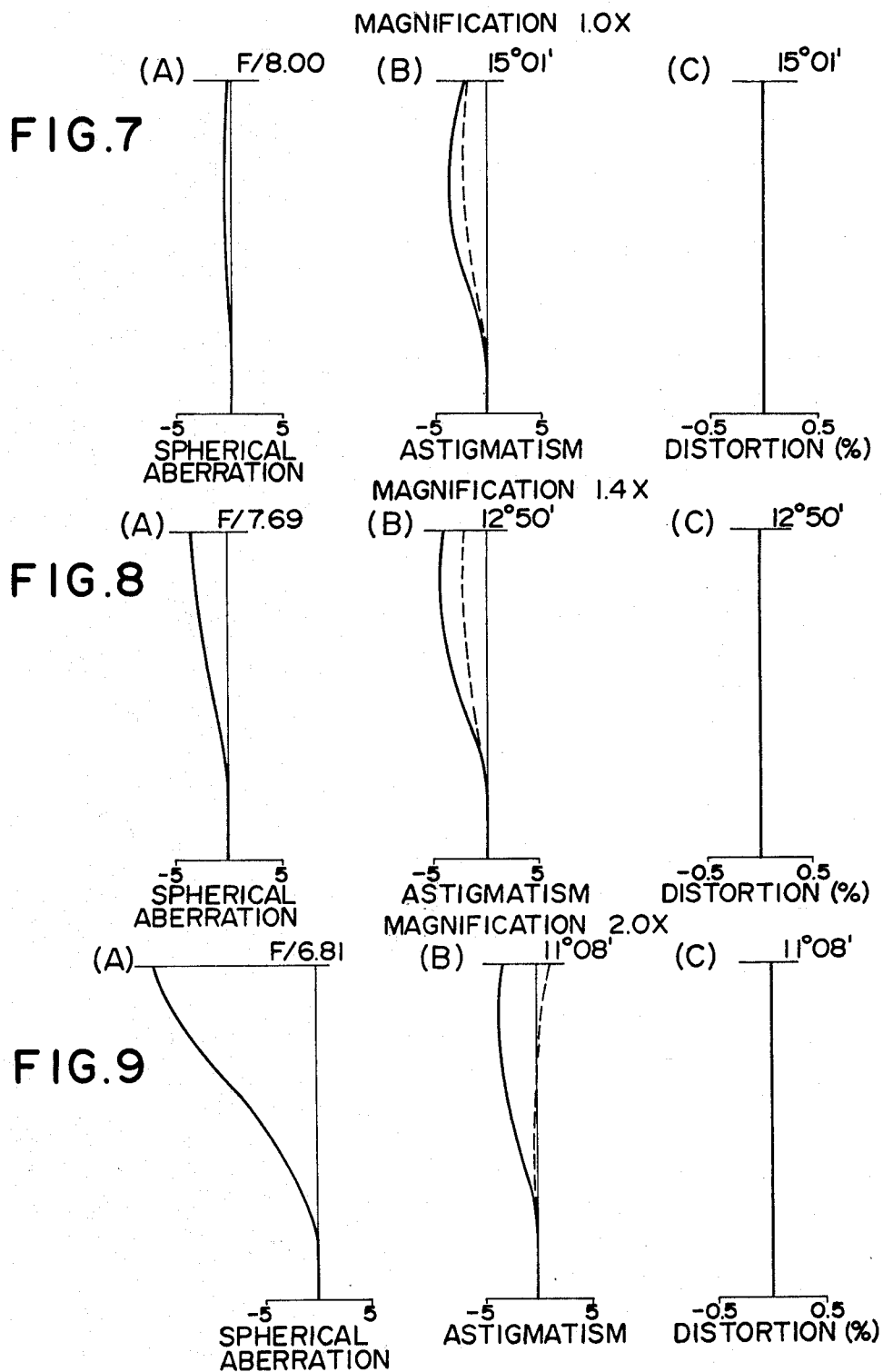

ZOOM LENS SYSTEM

BACKGROUND OF THE INVENTION

1. Field of the Invention

This invention relates to a zoom lens system, and more particularly to a zoom lens system which varies its magnification around unity and is particularly adapted for use in a copying machine or a process camera as an imaging lens, or in various optical systems as a relay lens.

2. Description of the Prior Art

In the copying machine and the process camera, the area of the object and the area of the focused image are generally very large in comparison with ordinary photography. Therefore, the diameter and the length of the lens system used therein are comparatively large in order to obtain a necessary angle of view and a necessary focal length. From the viewpoint of manufacturing and the structure of the machine, the lens system used therein is desired to be made as compact as possible. Further, in the copying machine and the process camera, the lens is required to be completely free from aberrations. Particularly, the distortion of the image should strictly be eliminated in this kind of lens.

Therefore, the lens system used in the copying machine or in the process camera is generally a symmetric type lens which is theoretically free from distortion at a magnification of unity. In this case, in order to change the magnification of the optical system without changing the focal length of the lens, at least two out of the three elements that are the object plane, the image plane and the lens must be moved as is well known in the art. In practical use, however, it is very troublesome and undesirable to move two of these elements. Even if the two elements which are to be moved together are interlocked with each other by means of a motion transmitting mechanism, the structure of the copying machine or the like would be very much complicated. Further, it is theoretically inevitable that the distance between the object and the image be elongated when the magnification is changed from unity. Besides, even when a symmetric type lens which is free from distortion when magnification is unity is used, there appears distortion when the magnification is varied from unity. Of course, when the magnification is greatly changed, other aberrations also appear and deteriorate the quality of the image obtained.

On the other hand, it has been known in the art to use attachment lenses in order to change the magnification of a focusing lens in a copying machine or the like without changing the positions of the object and the image. This method, however, is disadvantageous in that the magnification cannot be varied continuously and a complicated mechanism is required to substitute the attachment lenses every time when the magnification is to be changed. Further, in this method, if a wide magnification range is desired, a high power attachment lens is necessary, and thereby various aberrations increase in addition to the distortion significantly increasing.

SUMMARY OF THE INVENTION

The primary object of the present invention is to provide a zoom lens system which can be used as a imaging lens in a copying machine or the like capable of continuously varying the magnification of the image obtained thereby.

Another object of the present invention is to provide a zoom lens system which is free from distortion and the focus shift caused by fluctuation of the field curvature over the whole range of its variation in magnification.

Still another object of the present invention is to provide a zoom lens system which is compact in size.

The zoom lens system in accordance with this invention is composed of a first fixed lens group, a first movable lens group, a second movable lens group and a second fixed lens group arranged in this order from front (object side) to rear (image side), wherein a stop is located at the center of the whole lens system and the first fixed lens group and the second fixed lens group consist of the same lens elements and are located symmetrically opposite to each other on both sides of the stop, and similarly the first movable lens group and the second movable lens group consist of the same lens elements and are located symmetrically opposite to each other on both sides of the stop, and the first movable lens and the second movable lens are asymmetrically moved with respect to the stop when the magnification of the system is varied, whereby the distortion and the focus shift caused by the field curvature fluctuation are eliminated throughout its zooming operation to vary the magnification while an overall conjugate distance is fixed. Further, the zoom lens system in accordance with this invention is characterized in that the power of the lens groups and the lens elements is designed to make the whole lens system compact in size.

BRIEF DESCRIPTION OF THE DRAWING

FIGS. 5 to 9 are graphs which show the corrected aberrations of the lens systems in accordance with this invention wherein A shows the spherical aberration, B shows the astigmatism and C shows the distortion.

DESCRIPTION OF THE PREFERRED EMBODIMENTS

A zoom lens system which has a constant conjugate distance can be realized by making at least two lens groups movable. Since the magnification is to be varied around unity, a symmetrical construction of lens elements which has no distortion theoretically at unity magnification is desirable. In order to restrain the distortion throughout the variable range of magnification, therefore, it is desired that the two movable lens groups should be always moved to approximately symmetric positions with respect to the stop to the extent that the fundamental symmetry of the whole lens system is not deformed.

The size of the zoom lens is determined by how the power is shared among the lens groups constituting the zoom lens system. If the power of the movable lens groups is made low, the distance of movement of the lens groups becomes long though the structure of the lens elements can be made simple. Therefore, the total size of the zoom lens system becomes large in this case. If the power of the movable lens groups is made high, on the other hand, the distance of movement of the lens groups is made small and a compact zoom lens system can be obtained. However, in this case, the power should not be made too high so that the lens system will not be subject to too large a fluctuation of aberrations when the magnification is varied. Thus, in order to obtain a zoom lens system which has a practically sufficient aperture and field angle, the share of the power to the movable lens groups must be appropriately controlled.

The zoom lens system in accordance with the present invention is intended to have proper sharing of the power between the movable and the fixed lens groups considering a compromised size of the whole lens system. Thus, sufficient compactness is able to be obtained by the condition as formulated below, $$2.0 < \frac{f_{1.0}}{|f_V|} < 3.0$$

where $f_{1.0}$ is the focal length of the whole lens system when the magnification is unity and $f_V$ is the focal length of the movable lens group. If the above value falls below the lower limit, i.e. the power of the movable lens is too low, the fluctuation of aberrations is made small but the size of the lens system becomes large. If the above value exceeds the upper limit, i.e. the power of the movable lens is too high, the size of the lens system is made small but the fluctuation of aberrations is made too large.

Further, the zoom lens system in accordance with this invention is characterized in that fixed lens groups are located outside the movable lens groups so that the structure of the lens barrel is simplified and the maintenance of the lens system is facilitated. Besides this, the structures of the two fixed lens groups are made completely equivalent to each other, and so are the structures of the two movable lens groups, whereby the manufacturing cost of the lens system is markedly reduced.

Figure 1:
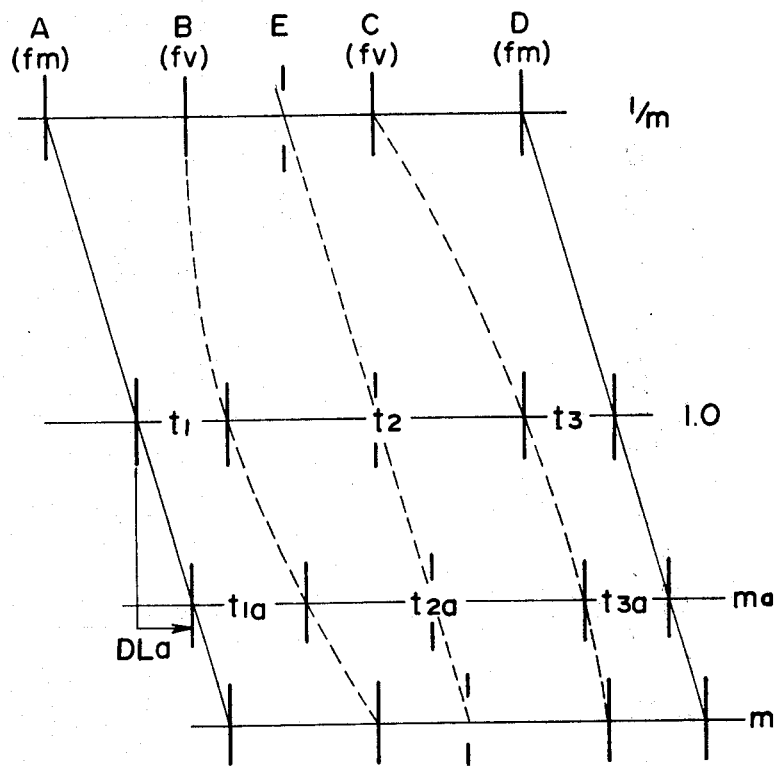
FIG. 1 is a diagram which shows the movement of the lens groups of the zoom lens system in accordance with the present invention.

Referring to FIG. 1, A and D denote fixed lens groups having the same structure and the same focal length fm, and B and C denote movable lens groups having the same structure and the same focal length fv. Fixed lens groups A and D are located symmetrically with respect to a stop E at the center of the whole lens system. Movable lens groups B and C are also located symmetrically with respect to the stop E when the magnification of the lens system is unity. The axial distance between the first fixed lens group A and the first movable lens group B is designated by t1, and similarly, the axial distance between B and C by t2 and that between C and D by t3. The amount of movement of the whole lens system for effecting the variation of the magnification is designated by DL. These distances t1, t2, t3 and DL are designated by t1$a$, t2$a$, t3$a$ and DL$a$ when the magnification of the whole lens system is changed from 1 to m$a$. The amount of movement DL$a$ for effecting the change in magnification determines t1$a$ and t3$a$, and t2$a$ is determined by t1$a$ and t3$a$, which means that changed values of the parameter DL$a$ result in an infinity of t1$a$ and t3$a$ values as the solution. Therefore, by selecting a proper DL$a$, it is possible to make t1$a$=t3$a$ so that the two movable lens groups B and C are moved to the position where the movable lens groups are located symmetrically with respect to the stop E at the center of the lens system. However, in this case, since the distortion cannot be made 0% except when the magnification is unity, it is desired that the two movable lens groups are located at the symmetric position only when the magnification is unity and it is better that for other t1$a$ and t3$a$ be slightly asymmetric.

The zoom lens system in accordance with this invention is thus characterized in that the distortion is always kept at zero for any magnifications by continuously selecting the proper combinations of t1$a$ and t3$a$ values.

Figure 2:
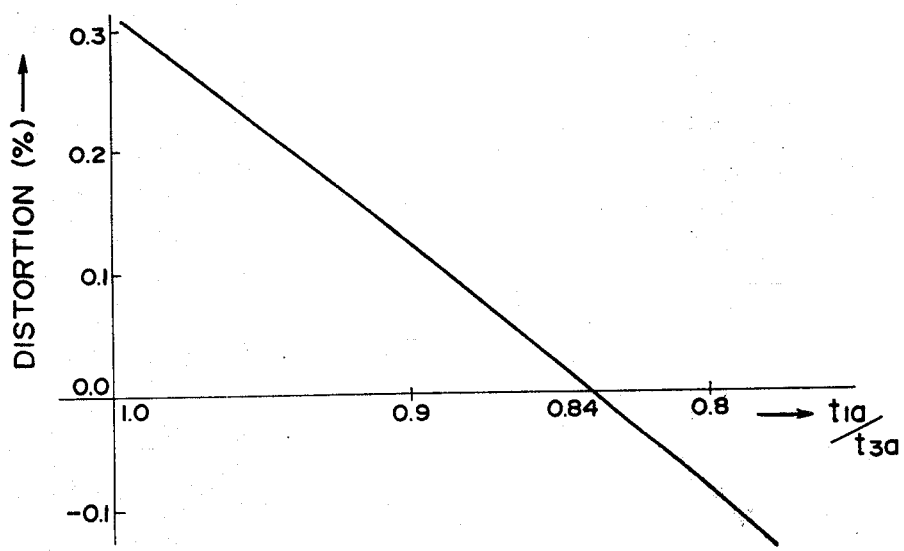
FIG. 2 is a graphical representation which shows the relationship between the movement of the movable lens groups and the distortion.

FIG. 2 shows the relationship between the distortion and the ratio of t1$a$ to t3$a$ when the magnification is 0.5X for example. From FIG. 2 it is known that the 0.3% of distortion is eliminated by changing the ratio t1$a$/t3$a$ from 1.0 to 0.84. This means that the distortion which appears when the movable lens groups B and C are located at symmetric position with respect to the stop E is eliminated by moving the movable lens groups to an asymmetric position.

Figure 3:
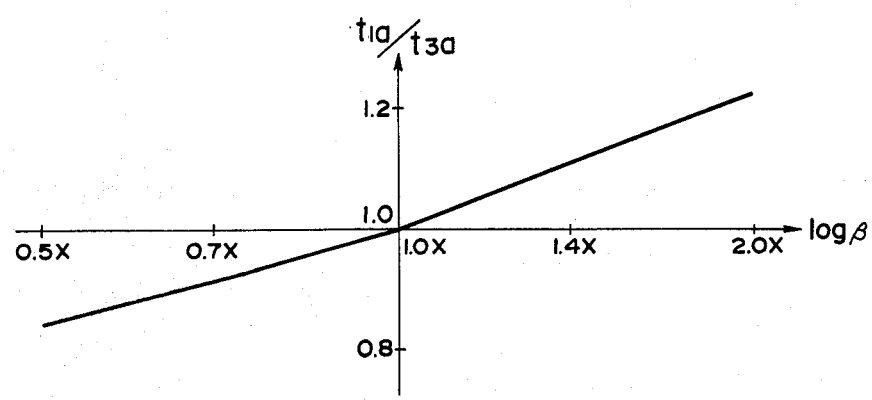
FIG. 3 is a graphical representation which shows the relationship between the movement of the movable lens groups to eliminate the distortion and the magnifications of the lens system.
Figure 4:
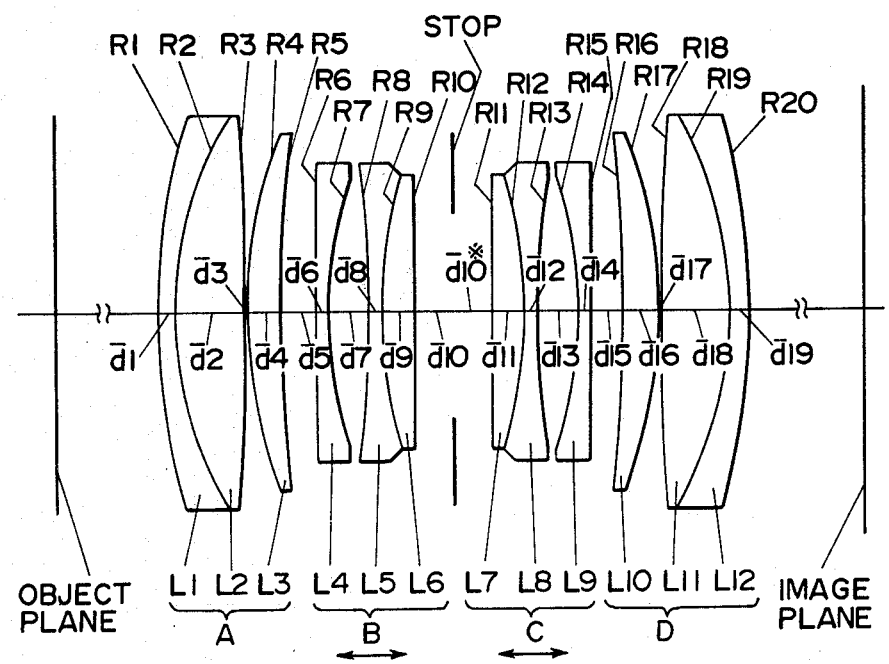
FIG. 4 is a sectional view of an embodiment of the lens system in accordance with this invention.
Figure 5:
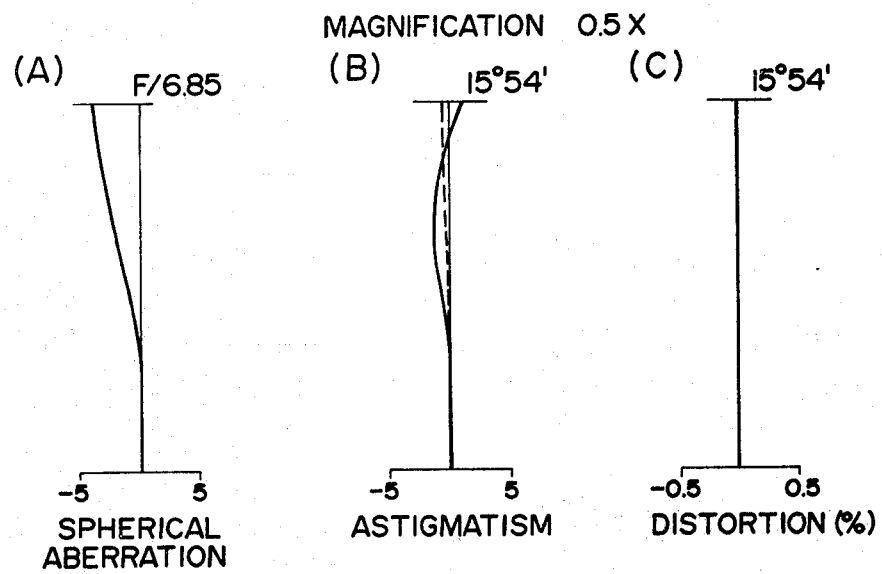
Figure 6:
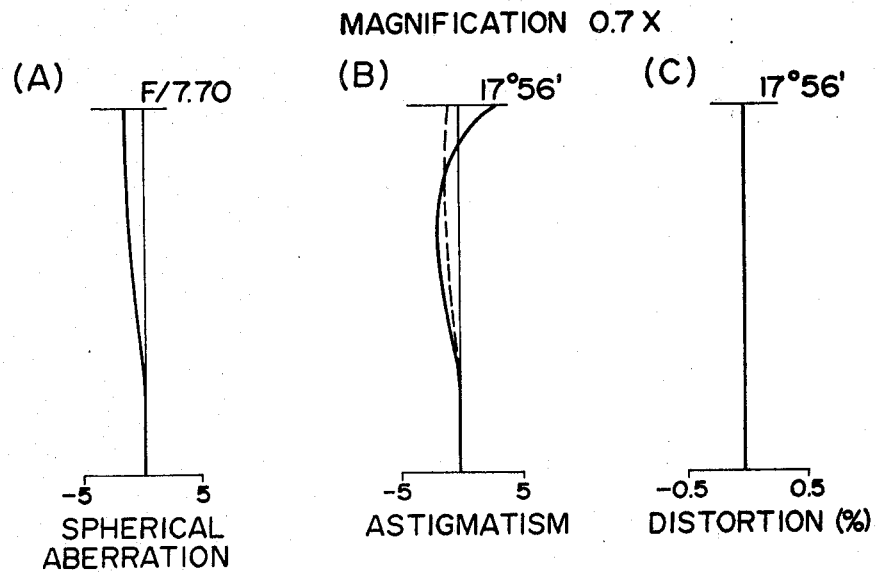

FIG. 3 shows the relationship between the magnification of the lens system and the ratio t1$a$/t3$a$ to keep the distortion at 0%. The magnification is represented by log$\beta$ ($\beta$ is magnification). From FIG. 3 it is known that the distortion can be maintained at 0% by properly selecting the ratio t1$a$/t3$a$ for any magnifications.

Another important factor which must be considered in the zoom lens system is the fluctuation in the field curvature which appears when the magnification is varied. Particularly in a copying machine and a process camera in which the object plane is a flat surface, the image plane should be flat and accordingly it is desired that the center of focal depth composite for overall field angle be fixed on a flat image plane. However, the center of focal depth is generally displaced from the so-called Gaussian image plane and the amount of displacement varies as the magnification varies. Therefore, it is very difficult to always obtain a sharp image on a fixed plane throughout the variation in magnification without introducing any correction method of arranging composite focal depth centers in a same axial position even if the field curvature is varied.

The best way to effect the above correction is to use means which is effective at the same time to correct the distortion as well as the displacement of the focal plane in view of the structural simplicity, the manufacturing advantage and the cost saving of the lens system.

In accordance with the present invention, therefore, the movement of the second movable lens group whose primary function is to fix the Gaussian image plane is also used to cancel the composite image plane displacement so that said values combine multiple purpose. Thus, as the result, the simple movement of the second movable lens group not only functions to correct the distortion but also functions to maintain the image plane at the fixed position besides its major role or performing the zooming motion.

Now two examples of the present invention will be described in tables, in which the radii of curvature of the refracting surfaces, the axial air separations or thicknesses of lenses, the refractive indices for the d-line and the Abbe dispersion numbers are respectively designated at R, d, N and $\nu$ numbered respectively by subscripts in order from front to rear.

EXAMPLE 1

F / 8 focal length = 490~550         magnification = −2.0x ~ −0.5x

| R | d | N | ν |
|---|---|---|---|
| $R_1 = 190.495$ | | | |
| | $d_1 = 6.00$ | $N_1 = 1.78472$ | $\nu_1 = 25.7$ |
| $R_2 = 113.337$ | | | |
| | $d_2 = 20.00$ | $N_2 = 1.62041$ | $\nu_2 = 60.3$ |
| $R_3 = -1254.7$ | | | |
| | $d_3 = 1.00$ | | |
| $R_4 = 154.416$ | | | |
| | $d_4 = 10.00$ | $N_3 = 1.62041$ | $\nu_3 = 60.3$ |
| $R_5 = 506.725$ | | | |
| | $d_5 = $ variable | | |
| $R_6 = 1013.4$ | | | |
| | $d_6 = 3.94$ | $N_4 = 1.71700$ | $\nu_4 = 47.9$ |
| $R_7 = 127.044$ | | | |
| | $d_7 = 11.80$ | | |
| $R_8 = -304.601$ | | | |
| | $d_8 = 3.94$ | $N_5 = 1.51633$ | $\nu_5 = 64.0$ |
| $R_9 = 146.785$ | | | |
| | $d_9 = 9.85$ | $N_6 = 1.68893$ | $\nu_6 = 31.1$ |
| $R_{10} = 2845.8$ | | | |
| | $d_{10} = $ variable | | |
| stop | | | |
| | $d_{10}^* = $ variable | | |
| $R_{11} = -2845.8$ | | | |
| | $d_{11} = 9.85$ | $N_7 = 1.68893$ | $\nu_7 = 31.1$ |
| $R_{12} = -146.785$ | | | |
| | $d_{12} = 3.94$ | $N_8 = 1.51633$ | $\nu_8 = 64.0$ |
| $R_{13} = 304.601$ | | | |
| | $d_{13} = 11.80$ | | |
| $R_{14} = -127.044$ | | | |
| | $d_{14} = 3.94$ | $N_9 = 1.71700$ | $\nu_9 = 47.9$ |
| $R_{15} = -1013.4$ | | | |
| | $d_{15} = $ variable | | |
| $R_{16} = -506.725$ | | | |
| | $d_{16} = 10.00$ | $N_{10} = 1.62041$ | $\nu_{10} = 60.3$ |
| $R_{17} = -154.416$ | | | |
| | $d_{17} = 1.00$ | | |
| $R_{18} = 1254.7$ | | | |
| | $d_{18} = 20.00$ | $N_{11} = 1.62041$ | $\nu_{11} = 60.3$ |
| $R_{19} = -113.337$ | | | |
| | $d_{19} = 6.00$ | $N_{12} = 1.78472$ | $\nu_{12} = 25.7$ |
| $R_{20} = -190.495$ | | | |

| | | | | | |
|---|---|---|---|---|---|
| magnification | −2.0 | −1.4 | −1.0 | −0.7 | −0.5 |
| focal length | 491.4 | 535.6 | 551.0 | 535.8 | 492.2 |
| object distance | −654.0 | −829.3 | −1012.6 | −1195.8 | −1371.1 |
| image distance | 1379.4 | 1200.3 | 1014.8 | 831.6 | 656.8 |
| $d_5$ | 17.21 | 11.92 | 10.0 | 10.73 | 14.25 |
| $d_{10}$ | 3.68 | 8.97 | 10.89 | 10.16 | 6.64 |
| $d_{10}^*$ | 6.80 | 10.28 | 10.98 | 9.11 | 4.01 |
| $d_{15}$ | 14.09 | 10.61 | 9.91 | 11.78 | 16.88 |
| conjugate distance at the composite image plane | 2200.0 | 2200.0 | 2200.0 | 2200.0 | 2200.0 |

EXAMPLE 2

F / 5.6 focal length = 330~345         magnification = −1.0x ~ −0.65x

| R | d | N | ν |
|---|---|---|---|
| $R_1 = 194.211$ | | | |
| | $d_1 = 5.03$ | $N_1 = 1.68893$ | $\nu_1 = 31.1$ |
| $R_2 = 95.877$ | | | |
| | $d_2 = 16.06$ | $N_2 = 1.62041$ | $\nu_2 = 60.3$ |
| $R_3 = 12588.9$ | | | |
| | $d_3 = 0.60$ | | |
| $R_4 = 103.135$ | | | |
| | $d_4 = 9.10$ | $N_3 = 1.71300$ | $\nu_3 = 53.9$ |
| $R_5 = 1150.4$ | | | |
| | $d_5 = $ variable | | |
| $R_6 = 4085.8$ | | | |
| | $d_6 = 3.88$ | $N_4 = 1.70154$ | $\nu_4 = 41.1$ |
| $R_7 = 87.991$ | | | |
| | $d_7 = 9.84$ | | |
| $R_8 = -580.450$ | | | |
| | $d_8 = 3.88$ | $N_5 = 1.51633$ | $\nu_5 = 64.0$ |
| $R_9 = 111.224$ | | | |
| | $d_9 = 8.05$ | $N_6 = 1.68893$ | $\nu_6 = 31.1$ |
| $R_{10} = 572.600$ | | | |
| | $d_{10} = $ variable | | |
| stop | | | |
| | $d_{10}^* = $ variable | | |

| | | | |
|---|---|---|---|
| $R_{11} = -572.600$ | $d_{11} = 8.05$ | $N_7 = 1.68893$ | $\nu_7 = 31.1$ |
| $R_{12} = -111.224$ | $d_{12} = 3.88$ | $N_8 = 1.51633$ | $\nu_8 = 64.0$ |
| $R_{13} = 580.450$ | $d_{13} = 9.84$ | | |
| $R_{14} = -87.991$ | $d_{14} = 3.88$ | $N_9 = 1.70154$ | $\nu_9 = 41.1$ |
| $R_{15} = -4085.8$ | $d_{15} =$ variable | | |
| $R_{16} = -1150.4$ | $d_{16} = 9.10$ | $N_{10} = 1.71300$ | $\nu_{10} = 53.9$ |
| $R_{17} = -103.135$ | $d_{17} = 0.60$ | | |
| $R_{18} = -12588.9$ | $d_{18} = 16.06$ | $N_{11} = 1.62041$ | $\nu_{11} = 60.3$ |
| $R_{19} = -95.877$ | $d_{19} = 5.03$ | $N_{12} = 1.68893$ | $\nu_{12} = 31.1$ |
| $R_{20} = -194.211$ | | | |
| magnification | $-1.0$ | $-0.74$ | $-0.65$ |
| focal length | 345.4 | 338.1 | 330.6 |
| object distance | $-621.3$ | $-722.2$ | $-765.5$ |
| image distance | 622.4 | 521.5 | 478.3 |
| $d_5$ | 4.70 | 5.15 | 5.85 |
| $d_{10}$ | 9.61 | 9.16 | 8.47 |
| $d_{10}*$ | 9.66 | 8.69 | 7.82 |
| $d_{15}$ | 4.66 | 5.63 | 6.50 |
| conjugate distance at the composite image plane | 1384.2 | 1384.2 | 1384.2 |

We claim:

1. A zoom lens system comprising a first fixed lens group, a first movable lens group, a second movable lens group and a second fixed lens group arranged in this order from front to rear, wherein a stop is located at the center of the whole lens system and the first fixed lens group and the second fixed lens group are located symmetrically with respect to the stop, and the first movable lens group and the second movable lens group are located symmetrically with respect to the stop, and the first movable lens and the second movable lens are asymmetrically moved with respect to the stop when the magnification of the system is varied.

2. A zoom lens system as defined in claim 1 wherein the structure of said first fixed and movable lens group is the same as that of said second fixed and movable lens groups, respectively.

3. A zoom lens system as defined in claim 1 wherein the focal length of said lens system $f_{1.0}$ when the magnification is unity and the focal length of the movable lens group $f_v$ satisfy the condition of $2.0 < f_{1.0}/|f_v| < 3.0$.

4. A zoom lens system as defined in claim 1 having the following constructional data wherein the radii of curvature of the refracting surfaces, the axial air separations or thicknesses of lenses, the refractive indices for the d-line and the Abbe dispersion numbers are respectively designated at R, d, N and $\nu$ numbered respectively by subscripts in order from front to rear,

| | | | |
|---|---|---|---|
| $R_1 = 190.495$ | $d_1 = 6.00$ | $N_1 = 1.78472$ | $\nu_1 = 25.7$ |
| $R_2 = 113.337$ | $d_2 = 20.00$ | $N_2 = 1.62041$ | $\nu_2 = 60.3$ |
| $R_3 = -1254.7$ | $d_3 = 1.00$ | | |
| $R_4 = 154.416$ | $d_4 = 10.00$ | $N_3 = 1.62041$ | $\nu_3 = 60.3$ |
| $R_5 = 506.725$ | $d_5 =$ variable | | |
| $R_6 = 1013.4$ | $d_6 = 3.94$ | $N_4 = 1.71700$ | $\nu_4 = 47.9$ |
| $R_7 = 127.044$ | $d_7 = 11.80$ | | |
| $R_8 = -304.601$ | $d_8 = 3.94$ | $N_5 = 1.51633$ | $\nu_5 = 64.0$ |
| $R_9 = 146.785$ | $d_9 = 9.85$ | $N_6 = 1.68893$ | $\nu_6 = 31.1$ |
| $R_{10} = 2845.8$ | $d_{10} =$ variable | | |
| stop | $d_{10}* =$ variable | | |
| $R_{11} = -2845.8$ | $d_{11} = 9.85$ | $N_7 = 1.68893$ | $\nu_7 = 31.1$ |
| $R_{12} = -146.785$ | $d_{12} = 3.94$ | $N_8 = 1.51633$ | $\nu_8 = 64.0$ |
| $R_{13} = 304.601$ | $d_{13} = 11.80$ | | |
| $R_{14} = -127.044$ | $d_{14} = 3.94$ | $N_9 = 1.71700$ | $\nu_9 = 47.9$ |

-continued

| | | | |
|---|---|---|---|
| $R_{15} = -1013.4$ | $\bar{d}_{15}$ = variable | | |
| $R_{16} = -506.725$ | $\bar{d}_{16} = 10.00$ | $N_{10} = 1.62041$ | $\nu_{10} = 60.3$ |
| $R_{17} = -154.416$ | $\bar{d}_{17} = 1.00$ | | |
| $R_{18} = 1254.7$ | $\bar{d}_{18} = 20.00$ | $N_{11} = 1.62041$ | $\nu_{11} = 60.3$ |
| $R_{19} = -113.337$ | $\bar{d}_{19} = 6.00$ | $N_{12} = 1.78472$ | $\nu_{12} = 25.7$ |
| $R_{20} = -190.495$ | | | | where $\bar{d}_5$, $\bar{d}_{10}$, $\bar{d}_{10}^*$ and $\bar{d}_{15}$ are 17.21, 3.68, 6.80 and 14.09 when the magnification is −2.0; 11.92, 8.97, 10.28 and 10.61 when the magnification is −1.4; 10.0, 10.89, 10.98 and 9.91 when the magnification is −1.0; 10.73, 10.16, 9.11 and 11.78 when the magnification is −0.7; and 14.25, 6.64, 4.01 and 16.88 when the magnification is −0.5, respectively.

5. A zoom lens system as defined in claim 1 having the following constructional data wherein the radii of curvature of the refracting surfaces, the axial air separations or thicknesses of lenses, the refractive indices for the d-line and the Abbe dispersion numbers are respectively designated at R, d, N and $\nu$ numbered respectively by subscripts in order from front to rear,

| | | | |
|---|---|---|---|
| $R_1 = 194.211$ | $\bar{d}_1 = 5.03$ | $N_1 = 1.68893$ | $\nu_1 = 31.1$ |
| $R_2 = 95.877$ | $\bar{d}_2 = 16.06$ | $N_2 = 1.62041$ | $\nu_2 = 60.3$ |
| $R_3 = 12588.9$ | $\bar{d}_3 = 0.60$ | | |
| $R_4 = 103.135$ | $\bar{d}_4 = 9.10$ | $N_3 = 1.71300$ | $\nu_3 = 53.9$ |
| $R_5 = 1150.4$ | $\bar{d}_5$ = variable | | |
| $R_6 = 4085.8$ | $\bar{d}_6 = 3.88$ | $N_4 = 1.70154$ | $\nu_4 = 41.1$ |
| $R_7 = 87.991$ | $\bar{d}_7 = 9.84$ | | |
| $R_8 = -580.450$ | $\bar{d}_8 = 3.88$ | $N_5 = 1.51633$ | $\nu_5 = 64.0$ |
| $R_9 = 111.224$ | $\bar{d}_9 = 8.05$ | $N_6 = 1.68893$ | $\nu_6 = 31.1$ |
| $R_{10} = 572.600$ | $\bar{d}_{10}$ = variable | | |
| stop | $\bar{d}_{10}^*$ = variable | | |
| $R_{11} = -572.600$ | $\bar{d}_{11} = 8.05$ | $N_7 = 1.68893$ | $\nu_7 = 31.1$ |
| $R_{12} = -111.224$ | $\bar{d}_{12} = 3.88$ | $N_8 = 1.51633$ | $\nu_8 = 64.0$ |
| $R_{13} = 580.450$ | $\bar{d}_{13} = 9.84$ | | |
| $R_{14} = -87.991$ | $\bar{d}_{14} = 3.88$ | $N_9 = 1.70154$ | $\nu_9 = 41.1$ |
| $R_{15} = -4085.8$ | $\bar{d}_{15}$ = variable | | |
| $R_{16} = -1150.4$ | $\bar{d}_{16} = 9.10$ | $N_{10} = 1.71300$ | $\nu_{10} = 53.9$ |
| $R_{17} = -103.135$ | $\bar{d}_{17} = 0.60$ | | |
| $R_{18} = -12588.9$ | $\bar{d}_{18} = 16.06$ | $N_{11} = 1.62041$ | $\nu_{11} = 60.3$ |
| $R_{19} = -95.877$ | $\bar{d}_{19} = 5.03$ | $N_{12} = 1.68893$ | $\nu_{12} = 31.1$ |
| $R_{20} = -194.211$ | | | | where $\bar{d}_5$, $\bar{d}_{10}$, $\bar{d}_{10}^*$ and $\bar{d}_{15}$ are 4.70, 9.61, 9.66 and 4.66 when the magnification is −1.0; 5.15, 9.16, 8.69 and 5.63 when the magnification is −0.74; and 5.85, 8.47, 7.82 and 6.50 when the magnification is −0.65, respectively.

* * * * *